Aug. 20, 1935.  H. A. ALLEN  2,012,076
PURIFYING APPARATUS
Filed Jan. 22, 1930  6 Sheets-Sheet 1

Inventor
Henry A. Allen
By Theodore W. Miller atty.

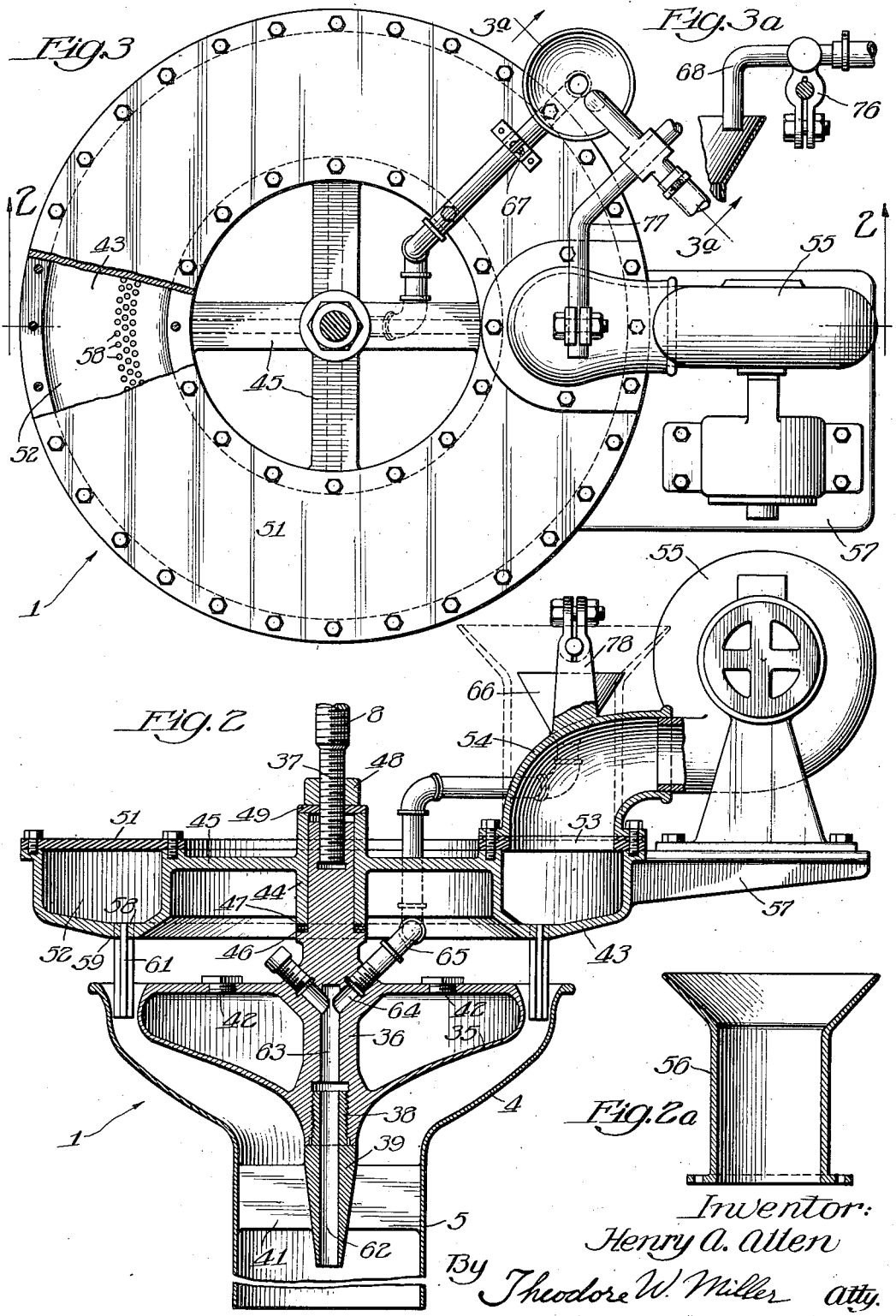

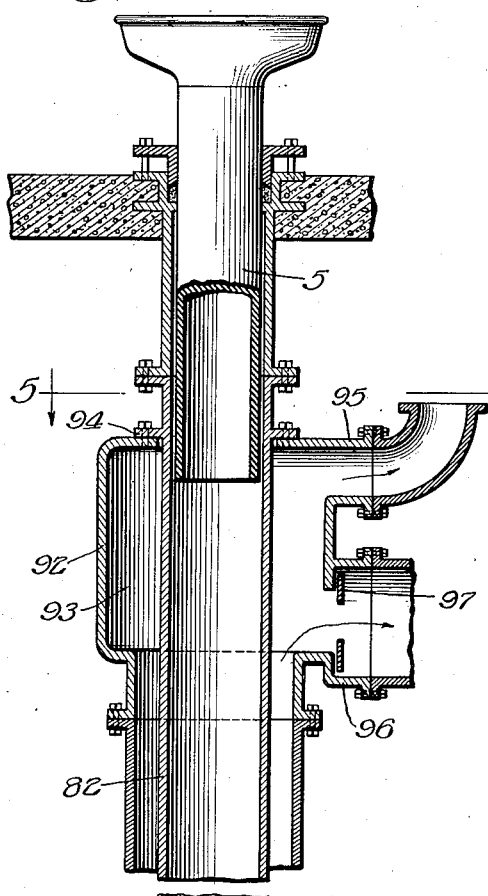
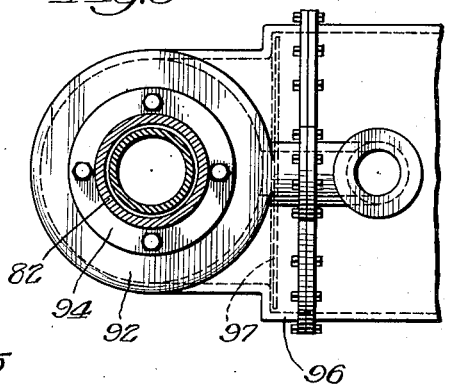
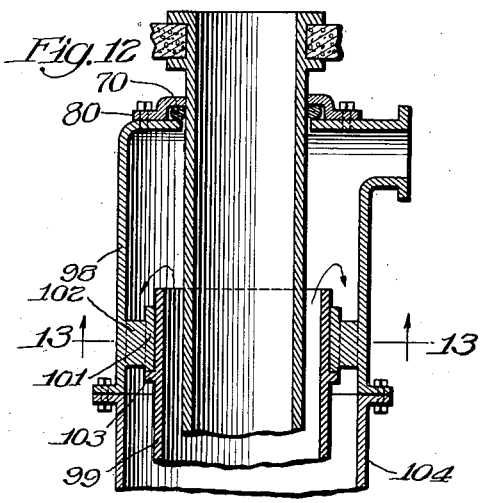
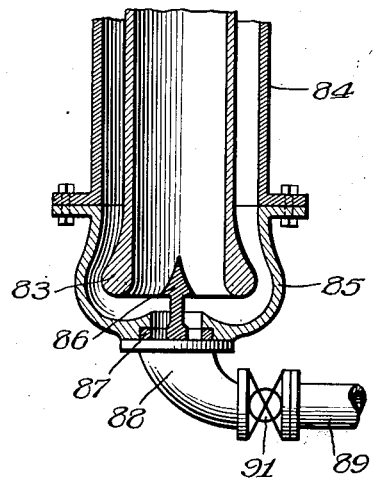

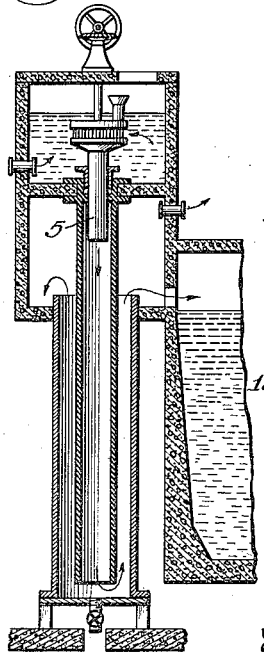
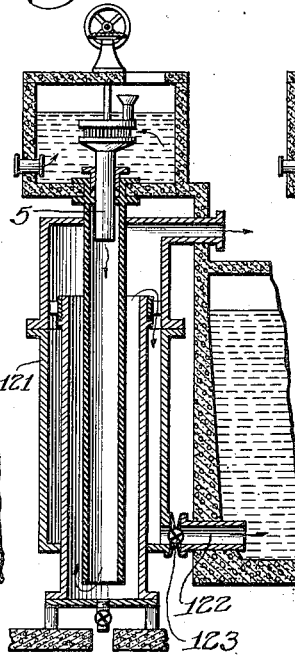
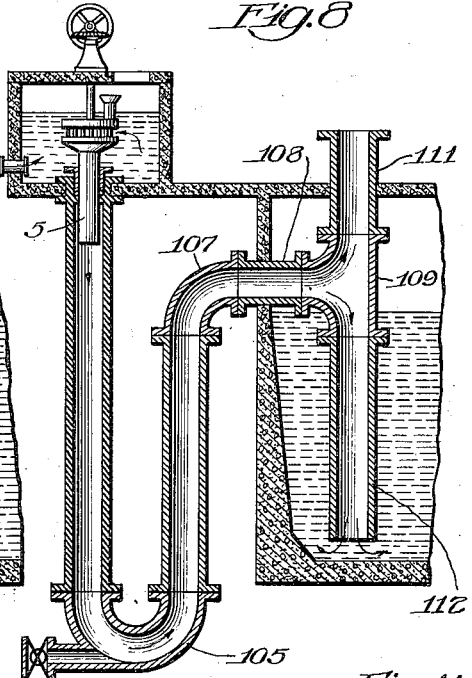
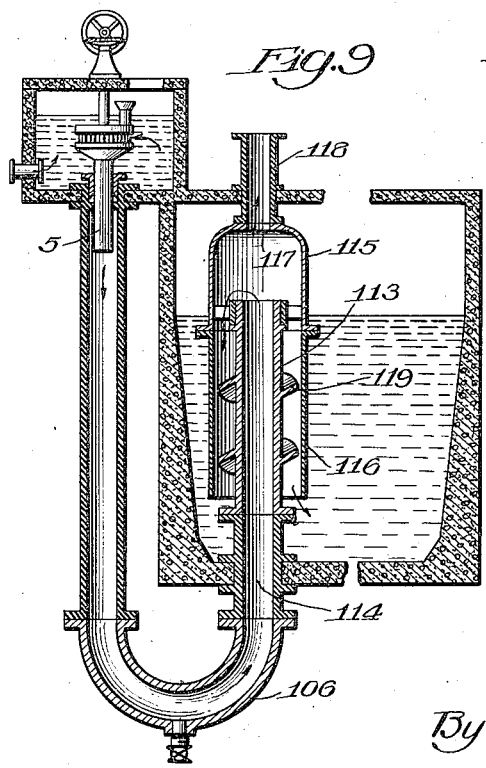
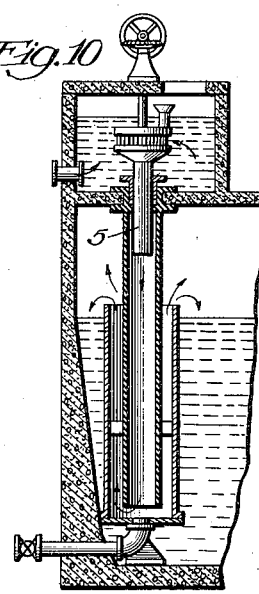
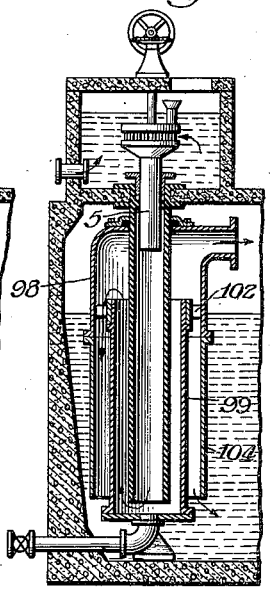

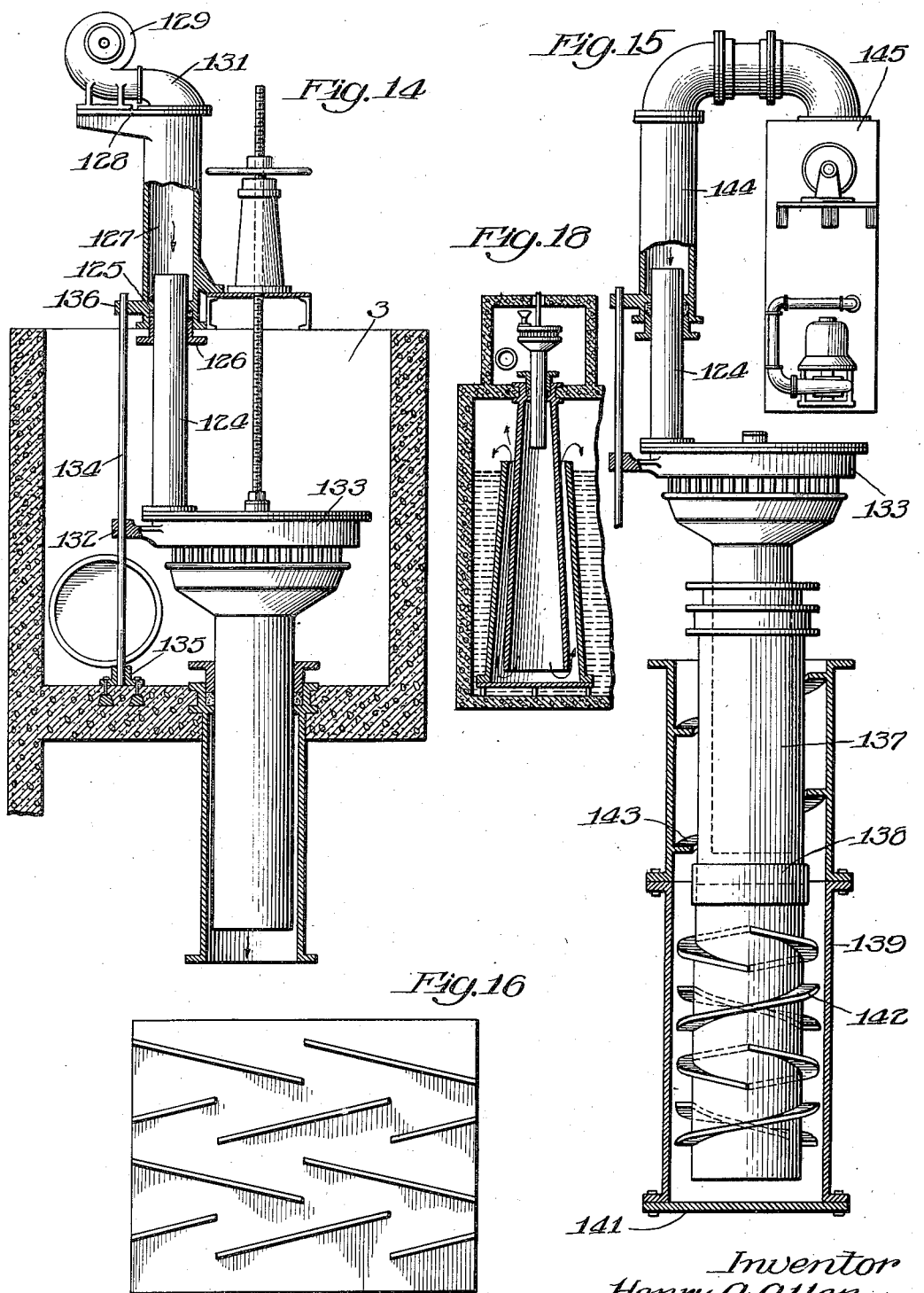

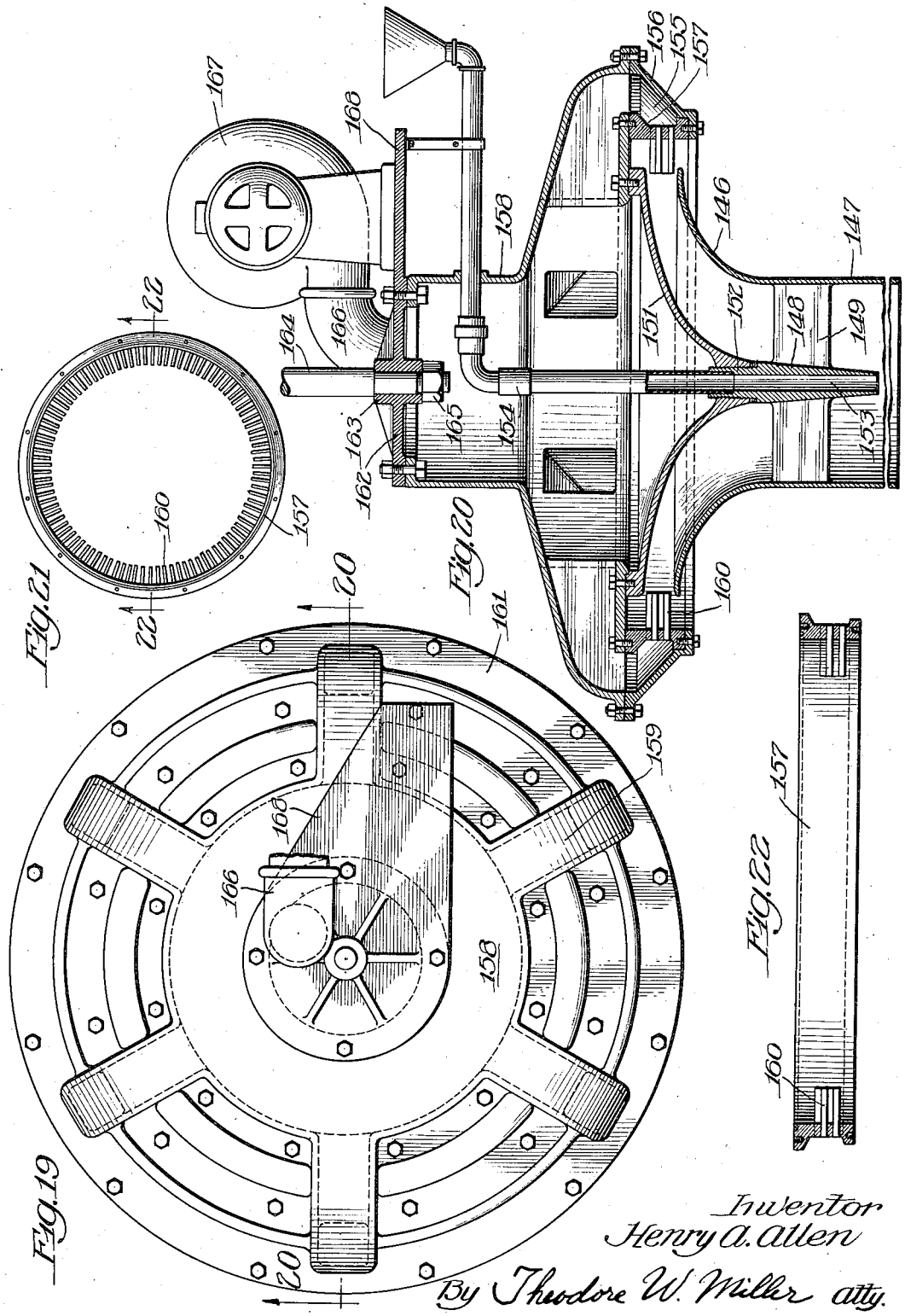

Patented Aug. 20, 1935

2,012,076

UNITED STATES PATENT OFFICE 2,012,076

PURIFYING APPARATUS

Henry A. Allen, Chicago, Ill.

Application January 22, 1930, Serial No. 422,585

13 Claims. (Cl. 210—26)

This invention relates in general to apparatus for mixing a plurality of fluids having a relative difference in density, and more particularly to water purifying apparatus.

The mixing of water with air and the subsequent separation of the air from the water is known to produce beneficial chemical and mechanical changes in the water, especially where the latter contains elements such as iron, manganese, sewage, waste material, etc. Apparatus for causing such aeration, involving the mixing of the water with air and the separation of the air from the water, has been known heretofore, such an apparatus having been patented in my prior Patent No. 1,236,645, of August 14, 1917. I have found that the air and water may be more intimately mixed by confining the flow of the combined water and air after it leaves the aerator head and bringing such flow to a lower level, and this intimate mixing may be obtained without the necessity of having an excessive head of water for delivery to the aerator by utilizing the U-tube principle in so confining the mixed water and air.

The primary object of my invention is, accordingly, to provide an aerator construction wherein a maximum of advantage is obtained for a given head of water delivered to the aerator.

A further object of my invention is to provide an improved construction found desirable from actual practice tending to a decrease in the cost of manufacture, assembly and accessibility, and an increase in efficiency.

Other objects of this invention will be apparent as the same becomes better understood from an examination of the description and claims in conjunction with the accompanying drawings, wherein:

Fig. 2 is an enlarged vertical sectional view of the head of the aerator;

Figure 1:
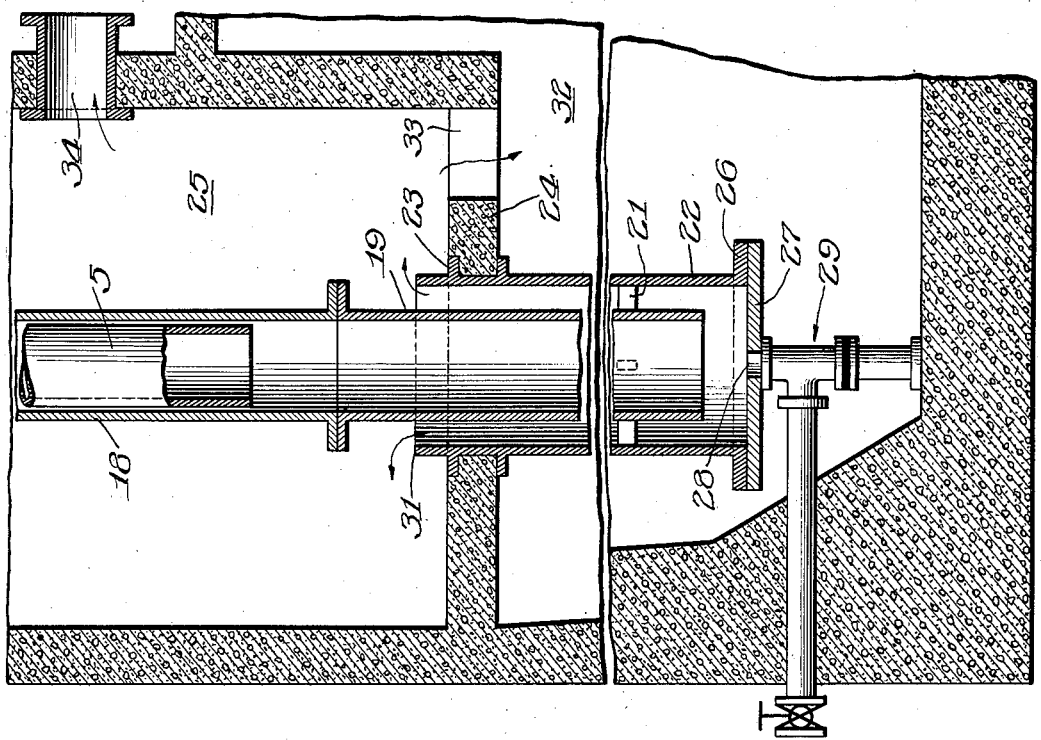
Fig. 1 is a fragmentary vertical sectional view, with parts in elevation, showing an aerator (the lower half is placed to the right of the upper half because of lack of space on the drawing) located at the end of a sedimentation basin such as used in certain filtration plants.
Figure 1:
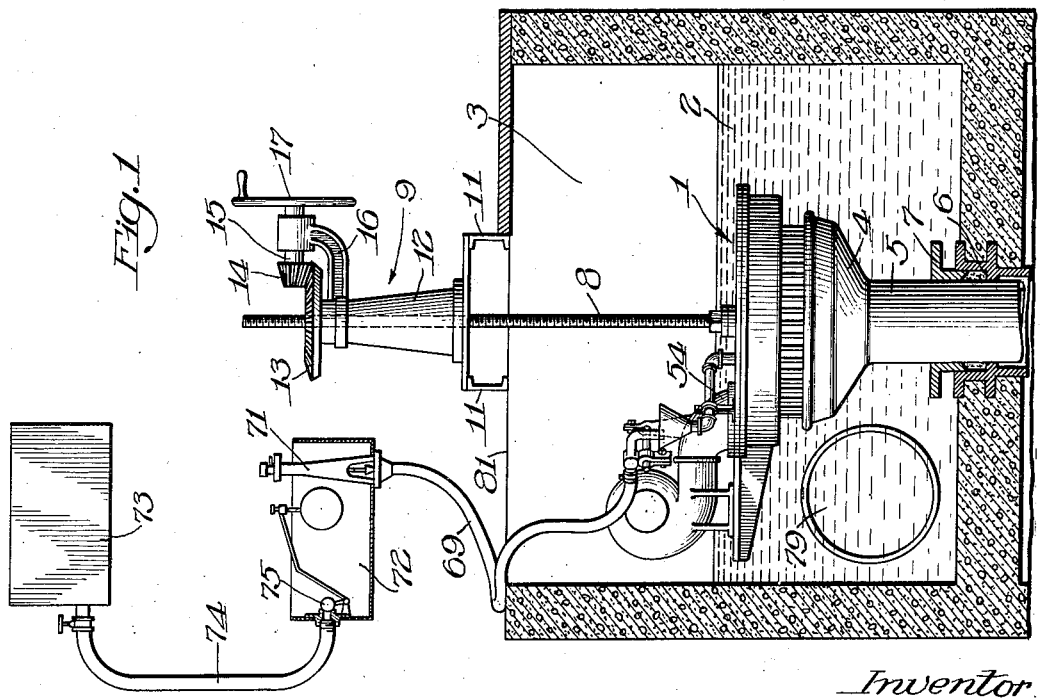

Fig. 2ª is a detail vertical section of an inlet piece adapted to be readily substituted for the inlet piece of the aerator shown in Fig. 2;

Fig. 3 is a plan view of the aerator head;

Fig. 3ª is a fragmentary section taken at the line 3ª—3ª of Fig. 3, with parts in elevation;

Fig. 4 is a vertical sectional view of a modification of the aerator of Fig. 1;

Fig. 5 is a section taken at the line 5—5 of Fig. 4;

Fig. 6 is a vertical sectional view, with parts in elevation, showing a modification of the apparatus shown in Fig. 1, but with the lower end of the apparatus supported at the bottom, instead of the top, and situated outside of the sedimentation basin instead of inside of said basin, as in Fig. 1;

Fig. 7 is a similar view of another modification;

Fig. 8 is a similar view of a further modification;

Fig. 9 is a similar view of a further modification;

Fig. 10 is a similar view of still another modification;

Fig. 11 is a similar view of a still further modification;

Fig. 12 is an enlarged fragmentary sectional view of the discharge head piece of the modified form of apparatus shown in Fig. 11;

Fig. 13 is a section taken at the line 13—13 of Fig. 12;

Fig. 14 is a fragmentary vertical sectional view, with parts in elevation, of a further modification;

Fig. 15 is a fragmentary detail vertical sectional view, with parts in elevation, of a modification of aerator as shown in Fig. 1;

Fig. 16 is a development view of the lower portion of the downflow tube of the modified form of discharge head shown in Fig. 15;

Fig. 18 is a vertical sectional view, with parts in elevation, indicating how the discharge end of the aerator may have its passages modified to conform with a given set of operating conditions;

Fig. 19 is a plan view of a modified form of aerator head with parts omitted;

Fig. 20 is a section taken at the line 20—20 of Fig. 19;

Fig. 21 is a plan view of the tube ring of the head shown in Figs. 19 and 20; and Fig. 22 is an enlarged section taken at the line 22—22 of Fig. 21.

Referring to the drawings more particularly, reference character 1 designates generally an aerator head wherein water 2 in the inlet chamber 3 of a waterworks plant is adapted to be mixed with air, as will be hereinafter more fully described. The mixed air and water is delivered to a bowl 4 which forms a part of the aerator head and is delivered to a downflow tube 5. This tube 5 extends through a stuffing box 6 and gland 7 therefor in the bottom of the chamber 3. The walls of the chamber 3 are preferably of concrete, as are the walls of the sedimentation basin to be hereinafter described.

The head 1 is attached to a threaded rod 8, as will be more particularly described hereinafter, and this rod extends vertically to a lifting apparatus 9 which is supported on channels 11 extending across the top of the chamber 3. This lifting apparatus includes a pedestal 12 supported on the channels 11, a beveled gear 13 threaded on the rod 8 and bearing against the top of the pedestal, a pinion 14 meshing with the gear 13 and mounted on a shaft 15 journaled in a bracket 16 and a hand wheel 17 on said shaft 15 for causing the raising and lowering of the rod 8 to thereby adjustably raise and lower the head 1. As the head 1 is raised and lowered, the tube 5 slides in and out of the stuffing box 6.

The stuffing box 6 is integrally formed at the upper end of an extension 18 for the downflow tube 5. This extension 18 is in turn connected to a second extension 19 on which is provided a plurality of radially-extending, angularly-spaced, integrally-formed centering lugs 21. These centering lugs 21 slidably engage the inner periphery of an upflow tube 22 which surrounds the lower portion of the downflow tube and/or extensions thereof to center the same within the upflow tube. This upflow tube is in practice made in a plurality of sections which may be suitably connected together, the upper one being flanged and connected through the intermediary of flanges 23 to the bottom 24 of a discharge chamber 25. The bottom of the tube 22 is flanged as at 26, and has bolted thereto a plate 27 for reversing the direction of flow of the mixed air and water coming down through the downflow tube and directing the flow upwardly through the upflow tube. The plate 27 is provided with an opening 28 therein connected with a blow-off system generally designated 29 for removing sediment collecting over said plate. The upper end of the upflow tube 22 is provided with a lip 31 preferably located a short distance above the water level in a sedimentation basin 32, to which water is adapted to be delivered through an opening 33 in the floor of the discharge chamber 25. The chamber 25 is provided with an air vent in the form of an opening and pipe section 34 therefor in the wall of said chamber.

This chamber 25 may be eliminated entirely, permitting the disengaged air to discharge into space above the surface of the water in the receiving receptacle, as indicated in Fig. 10.

The aerator head 1, in addition to the bowl 4 and downflow tube 5 integral therewith, as shown more particularly in Figs. 2 and 3, includes an inner bowl 35, the outer periphery of which co-operates with the inner periphery of the former bowl to form the inlet water passage for the aerator head. This inner bowl 35 has cast integral therewith a center spindle 36, its axis being concentric with both the inner and outer bowls. The upper end of the spindle 36 is drilled and internally threaded to receive a reduced threaded portion 37 on the lower end of the previously referred to rod 8 for connecting said rod to the aerator head. The lower end of the spindle 36 is drilled and internally threaded to receive a threaded extension 38 on the upper end of a central boss or hub 39 which is connected to the downflow tube 5 through the intermediary of integral radial ribs 41.

Plugs 42 for casting purposes are provided on the upper surface of the bowl 35, which is cast hollow.

An internal channel 43 provided with a hollow cylindrical hub 44 and integral connecting arms 45 is supported on the upper end of the spindle 36, the lower end of the hub 44 resting on a shoulder 46 integrally formed on said spindle, shims 47 being provided between said end and shoulder for a purpose which will be presently described. A nut 48 threaded on the portion 37 acts through the intermediary of a washer 49 to lock the hub 44 on the spindle 36 and to prevent unscrewing of the rod 8.

The annular channel 43 is provided with an annular cover 51 bolted thereto, which co-operates with said channel to form an annular air chamber 52. This cover is provided with an opening 53 and an air inlet piece 54 bolted to the cover at said opening. This inlet piece may be in the form of an elbow, as shown in full lines in Figs. 1 and 2, wherein it extends slightly above the water level and is adapted to be connected to the delivery end of a blower 55, or it may be in the form of a vertical cylinder 56 (shown in Fig. 2ª in full lines and in Fig. 2 in dotted lines) when it is not desired to use the blower. The blower is supported on a bracket 57 integrally formed on the channel 43. The bottom of the channel 43 is provided with inner and outer annular faces 58 and 59, respectively, which are turned true at right angles to the axis of the spindle 36 and the hub 44. This permits of convenient spacing and drilling of holes in the bottom of said channel between these faces. Annularly-arranged vertically-extending tubes 61 are expanded in holes formed between the faces 58 and 59 so as to depend a predetermined distance into the inlet water passage formed by the bowls 4 and 35. The depth to which these tubes 61 extend into the water inlet passage may be varied by varying the number of shims 47 used. These tubes 61 are preferably made of copper, bronze or similar material not easily corroded by the action of water and other chemical material carried in suspension or in solution. These tubes are provided uniformly all around the bottom of the chamber 43. A passage 62 is drilled through the hub 39 in alignment with a passage 63 drilled in the bottom of the spindle 36. The passage 63 connects with a lateral passage 64 also drilled in said spindle and threaded to receive the lower end of piping 65. The piping 65 is adapted to deliver a chemical solution to the passage 62 for delivering this solution to the downflowing mixture of air and water. To this end the upper end of the piping 65 is connected to a funnel 66 and is supported by means of a bracket 67 on the cover 51 so as to bring this funnel beneath a nozzle 68 connected through the intermediary of a flexible hose 69 to a chemical feed control 71 in an orifice box 72. This orifice box 72 is connected to a chemical tank 73 through the intermediary of a tight connection 74 and a float control valve 75 at the inlet end of said connection. As this chemical tank and attendant connections therefrom to the nozzle 68 are in themselves old and well known, they are not more particularly described. The nozzle 68 is supported by means of a bracket 76 on an arm 77, which is in turn supported on a lug 78 on the inlet piece 54.

In practice, water is delivered to the chamber 3 through an inlet 79 in the wall thereof to form a water level just above the surface of the cover 51 of the aerator head. The water flows into the passage formed by the bowls 35 and 4 around the lower ends of the air tubes 61. The water flows both from the outer periphery and from the inner periphery of said inlet, as the water may pass downwardly around the arms 45, as well as from the outside of the head. As the water flows past the lower ends of the tubes 61, it entrains the air therein and draws air from the chamber 52 and the atmosphere in the event the inlet piece 56 is used. In the event the blower 55 is used and the air is delivered to the chamber 56 at an initial pressure, the entrainment of air is facilitated.

The aerator head 1 may be adjusted upwardly and downwardly by the lifting gear 9 to accommodate any variations in water level. In order to provide for a maximum of adjustment of the aerator head 1 up and down by the lifting gear 9, the superstructure on said head is positioned to register with an opening 81 at the top of the chamber 3.

The inlet of the blower 55 may take air that has passed through an air washer, ozonator, ionizer, or from the immediately surrounding air. As shown in Fig. 4, the lower portion of the downflow tube from the aerator head, here designated as 82 is provided with an expanded end 83. The lower end of the upflow tube, here designated as 84, is in the form of a terminal cup-shaped casting 85 surrounding the end 83 and bolted to the tube 84 to form an efficient reversal of flow from the downflow tube to the upflow tube. In alignment with the tube 82 at the end 83 is positioned a deflector piece 86 provided with a base in the form of a spider 87, which is held in position by a reducing elbow 88. This elbow 88 is bolted to the bottom of the casting 85 and is connected at its discharge end to a blow-off or drain pipe 89 through the intermediary of a drain valve 91.

The upper end of the upflow tube 84 in this modification is bolted to the inlet of a cylindrical head 92, providing a discharge chamber 93. This head 92 is apertured and bolted to a flange 94 integrally formed on the downflow tube 82 and is provided with a flanged outlet 95 at its upper end, forming an air vent, and a somewhat larger flanged outlet 96 at its lower end for discharging the aerated water to the sedimentation basin or other receptacle through the intermediary of a conduit. This outlet 96 is preferably made rectangular in cross section and is provided with weir plates 97.

As shown in Figs. 11 to 13, inclusive, the discharge head, here designated as 98, for the upflow tube, here designated as 99, may be enlarged and held in position at the upper end of said upflow tube by means of a circular collar 101 connected to said head by means of integral ribs 102 cast therewith. A flange 103 integrally formed on the upflow tube 99 supports the collar 101, the upflow tube 99 being supported from below.

The head 98 is flanged at its lower end and bolted to an outer downflow tube 104, so that the aerated water, instead of being discharged through an outlet such as the outlet 96, Fig. 4, is discharged at the lower end of the tube 104 at the bottom of the sedimentation basin or other receptacle. This results in a considerable advantage, in that the time of settling the carried particles is effected by weight, size and depth of travel, whereby the precipitation of undesirable material in the water is greatly expedited.

The upper end of the head 98 is slidably connected to the downflow tube by means of a round rubber gasket 70 held in position by a clamping ring 80.

In Figs. 8 and 9 there are shown constructions wherein the upflow tube, instead of surrounding the downflow tube and being concentric therewith, is of substantially the same diameter and is connected to the downflow tube through the intermediary of a U-shaped casting, designated 105 in the modification shown in Fig. 8, and 106 in the modification shown in Fig. 9. In each of these constructions the upflow tube is intended to deliver the aerated water to the bottom of the sedimentation basin. In the construction of Fig. 8 this is effected by mounting the aerator, together with both the downflow and upflow tubes, outside of the sedimentation basin and connecting the upper end of the upflow tube through the intermediary of an elbow 107 and a pipe section 108 extending through the wall of the basin to a T-connection 109. The upper end of the T-connection 109 is connected to a pipe section 111 forming an air vent; and the lower end of the T-connection 109 is connected to a pipe extension 112 for delivering the aerated water to the bottom of the basin.

In the construction shown in Fig. 9 the aerator, together with only the downflow tube, is mounted outside of the sedimentation basin, and the upflow tube, here designated 113, is supported within the sedimentation basin and is connected to the delivery end of the U-shaped casting 106 through the intermediary of a pipe connection 114 extending through the bottom of said basin. A discharge head 115 for the upflow tube is connected to the upflow tube 113 in the same manner that the head 98, in the construction shown in Figs. 11 to 13, inclusive, is connected to the upflow tube thereof. This head 115 has an extension 116 depending therefrom, the same as in the construction referred to, for causing the delivery of the aerated water to the bottom of the sedimentation basin. The head 115, instead of having the lateral opening for the air, has a top opening 117 and a pipe connection 118 bolted thereto at said opening, and this connection may discharge into the atmosphere or be connected to an exhaust system or stack. Baffles 119, in the form of interrupted spirals, are integrally formed on the upflow tube 113 to facilitate mixing and the precipitation of any undesired material in the delivered water.

In Fig. 7 there is shown a construction similar to that of Figs. 11 to 13, inclusive, wherein the aerator is mounted outside of the sedimentation basin and the discharge head, here designated as 121, is adapted to deliver aerated water indirectly through the intermediary of a pipe connection 122 and gate valve 123 to the bottom of the sedimentation basin, instead of directly.

In Fig. 14 there is shown a construction which is substantially the same as that disclosed in Fig. 1, the only exception being that the lifting gear is the same as that disclosed in my aforesaid prior patent, and the inlet piece to the aerator head is in the form of an elongated cylinder 124, the lower end of which is flanged and bolted to the opening in the cover of said head the same as the corresponding inlet piece in said Fig. 1. In the modification shown in Fig. 14, however, this elongated cylindrical inlet piece 124 telescopes through a stuffing box 125 and gland 126 therefor at the bottom of a sleeve casting 127, the upper end of which is provided with an integral support 128 for mounting a blower 129 adapted to deliver air to said upper end through the intermediary of an elbow casting 131. This arrangement enables the blower to be placed outside of the aerator or receiving chamber 3. A lug 132 is integrally formed on the air channel 133 of the aerator head, and a guide rod 134 attached to the bottom of the chamber 3 through the intermediary of an apertured flanged casting 135, extends through said lug and another lug 136 on the casting 127. The casting 127 is suitably supported at the top of the chamber 3. The rod 134 prevents rotational movement of the aerator head and keeps the piece 124 and casting 127 in alignment.

In Fig. 15 there is shown a construction wherein the downflow tube 137 is provided in two sections which are connected together by means of a sleeve 138 which may be threaded to the respective sections or bolted thereto. The upflow tube 139 surrounds the downflow tube 137 and is closed by means of a plate 141 at its lower end to effect reversal of flow. This upflow tube 139 is also provided with two sections flanged and bolted together. The lower section of the downflow tube 137 has integrally formed on its outer periphery a plurality of baffles 142 preferably in the form of interrupted and reversed spirals, as shown by the development view in Fig. 16. Similar baffles 143 are integrally formed on the inner periphery of the upper section of the upflow tube. The upper end of the downflow tube 137 may be connected to the aerator the same as the downflow tube in the other embodiments, and the upper end of the upflow tube 139 may deliver aerated water either directly or indirectly through the top or bottom of a sedimentation basin or other container, as in the previous embodiments.

The construction of the upper end of the aerator shown in Fig. 15 is similar to that in Fig. 14, the only exception being that the casting here designated as 144, corresponding to the casting 127 in Fig. 14, is not connected directly to a blower, but is connected to receive air from an air conditioner 145. As air conditioners are well known, the air conditioner 145 is not more particularly described. By this arrangement the air or other gas delivered to the water may be preliminarily treated as desired.

The construction in Fig. 18 is drawn to illustrate the fact that when the conditions are other than those which would ordinarily obtain in water-treatment plants wherein it suffices to have the effective cross-sectional area of the downflow column of water be substantially the same as the effective cross-sectional area of the upflow of water in the downflow and upflow tubes, respectively, the relative effective cross-sectional areas may be varied to meet any set of operating conditions. The essential feature is that air or other fluid entrained in the downflowing column of water or other liquid is compressed on its downward travel, reaching its maximum pressure at the bottom or lowest portion of the downflow tube. The pressure of the entrained air at this point will be dependent upon the distance between this point and the point of discharge of the upflow tube and the average weight of the mixture. The work of compression if discharged into the receiving receptacle at the bottom of the downflow tube is partly consumed in its travel to the surface of the receptacle and the remainder lost on liberation of the air at the surface. Where an upflow tube is provided, by the proper proportioning of the relative effective areas of the tubes, taking into consideration friction and other losses due to flow, to confine the upflow, a considerable portion of the work of compression in the downflow tube is returned by work of expansion in the upflow tube. By use of the upflow tube not only is higher efficiency obtained, but a more intimate mixing is obtained because of a longer period of contact.

In Figs. 19 to 22, inclusive, is shown a modified form of aerator head. This head may be connected to the downflow tube of any of the aforedescribed embodiments in place of the head 1, and includes an outer bowl 146 and an integral downflow tube section 147 extending downwardly from the bottom of said bowl. A central hub 148 is provided within the upper end of the tube section 147 and connected thereto by integral ribs 149. An inner bowl 151 is threaded on an extension 152 on the hub 148, and its outer periphery cooperates with the inner periphery of the bowl 146 to form an annular inlet passage for the downflow tube section 147. Shims 150 on the extention 152 may be varied to raise or lower bowl 151 to vary water inlet. A passage 153 is drilled through the hub 148 and connected with piping 154 through which chemicals in solution may be delivered to the downflow of mixed air and water, as in the case of the aerator head in the previous embodiment. An air channel 155 is formed by an annular outside casting 156 and an inner tube ring 157, the lower edge of the casting 156 being flanged and bolted to the lower edge of said ring. A cylindrical casting 158 is flared at its lower end to form a cover for the aerator head, and is flanged at its lower edge and bolted to the upper edge of the casting 156. This cover 158 is in the form of a spider having six arms 159 joined together at their outer ends by a circular cover plate 161. The plate 161 forms the intermediary by means of which the casting 158 is bolted to the casting 156. This plate 161 is bolted to the tube ring 157.

The arms 159 are cast hollow and act to connect the central hollow portion of the casting 158 with the air channel 155. The tube ring 157 is provided throughout its entire periphery with a plurality of uniformly-spaced horizontally-extending tubes which extend into the inlet water passage for delivering air which passes from the central portion of the casting 158 through the arms 159 to the air channel 155 into the inlet water passage formed by the bowls 151 and 146. The water may pass between the arms 159 to enter the upper periphery of the water passage, as well as from below. The upper end of the casting 158 is closed by a cap 162 provided with a hub 163. A rod 164, corresponding to the rod 6 in Fig. 1, is secured in the hub 163 by a nut 165. The cap 162 is provided with a suitable opening and an inlet piece 166 connected to the delivery end of a blower 167 mounted upon an extension plate 168 on the cap 162. In this construction it will be seen that the tube ring is continuous, the same as in the case of the aerator head 1 in the first embodiment. However, in this construction the parts forming the water inlet are supported from the outer perimeter of the cover casting 158, whereas in the case of the head 1 of the first embodiment, all of the parts, including not only those forming the water inlet passages, but also the air chamber, are supported from above by a central spindle construction.

It will be apparent that the aforedescribed construction provides an efficient, simple and effective means for the elimination, or the preparing for elimination in other devices, in whole or in part, of impurities carried by or held in suspension in fluids, especially liquids such as water, by intimately mixing or permeating with another fluid or fluids such as chemicalized solvents, prepared effluents, air, sulphur dioxide, or other combination of gases, and that its use is not limited to aeration of water.

The aerators made according to my invention are practically self-contained, requiring but a minimum of space for installation and operation, thus permitting far greater leeway in size and design of receiving tanks or receptacles.

Other advantages in the use of my invention will be apparent without further description.

I am aware that many changes may be made without departing from the principles of this invention, and I therefore do not wish to be limited to the details shown or described.

I claim:

1. In an apparatus of the character described, the combination of an aspirator for combining a pair of fluids having a relative difference in density, a downflow tube for conveying the combined fluids to a lower level and an upflow tube of approximately the same cross-sectional area as the downflow tube communicating with the downflow tube for carrying the fluids to an intermediate level just below said aspirator.

2. In an apparatus of the character described, the combination of an aspirator for combining a pair of fluids having a relative difference in density, a downflow tube for conveying the combined fluids to a lower level and an upflow tube communicating with the downflow tube for carrying the fluids to an intermediate level just below said aspirator, the cross-sectional areas of the upflow tube bearing the predetermined ratio of approximately one to corresponding cross-sectional areas of the downflow tube.

3. In an apparatus of the character described, the combination of an aspirator for combining a pair of fluids having a relative difference in density, a downflow tube for conveying the combined fluids to a lower level and an upflow tube communicating with the downflow tube for carrying the fluids to an intermediate level just below said aspirator, the cross-sectional area of the upflow tube for a given depth bearing a predetermined ratio of approximately one to the cross-sectional area of the downflow tube at the same depth.

4. In an apparatus of the character described, the combination of a receptacle provided with an inlet adapted to receive a fluid, a second receptacle concentric with the first and adapted to deliver a second fluid into said inlet to be combined with the first fluid and a central spindle in the first receptacle for supporting said receptacles.

5. In an apparatus of the character described, the combination of a receptacle provided with an inlet adapted to receive a fluid, a second receptacle concentric with the first and adapted to deliver a second fluid into said inlet to be combined with the first fluid and a central spindle in the first receptacle and extending through the second receptacle for supporting said receptacles.

6. In an apparatus of the character described, the combination of a pair of annular concentric bowls connected together to form a receptacle and spaced from each other to form an inlet thereto adapted to receive a fluid, a central spindle integrally formed on one of said bowls and a second receptacle mounted on said spindle adapted to deliver a second fluid into said inlet to be combined with the first fluid.

7. In an apparatus of the character described, the combination of a receptacle provided with an inlet adapted to receive a fluid, said receptacle being provided also with a central spindle, a second receptacle concentric with the first and adapted to deliver a second fluid into said inlet to be combined with the first fluid, said spindle having a passage therethrough opening into the combined fluids, and means for delivering a chemical to said passage for treating said fluids therewith.

8. In an apparatus of the character described, the combination of a receptacle provided with spaced lips forming an annular inlet adapted to receive fluid over either lip and a second receptacle provided with a ring having a plurality of holes therein and tubes carried by said ring in the holes thereof and extending into said annular inlet to deliver a second fluid to the first receptacle for entrainment by the first fluid as it enters said inlet.

9. In an apparatus of the character described, the combination of a receptacle provided with horizontally spaced lips forming an annular inlet adapted to receive fluid over either lip, and a second receptacle provided with a ring having a plurality of holes therein and vertical tubes carried by said ring in the holes thereof and extending into said annular inlet to deliver a second fluid to the first receptacle for entrainment by the first fluid as it enters said inlet.

10. In an apparatus for the character described, the combination of a receptacle provided with vertically spaced lips forming an annular inlet adapted to receive fluid over either lip, and a second receptacle provided with a ring having a plurality of holes therein and horizontal tubes carried by said ring in the holes thereof and extending into said annular inlet to deliver a second fluid to the first receptacle for entrainment by the first fluid as it enters said inlet.

11. In an apparatus of the character described, the combination of a receptacle provided with an annular inlet adapted to receive a fluid from either periphery and a second receptacle concentric with the first and supported thereabove and adapted to deliver a second fluid into said inlet to be combined with the first fluid, said second receptacle being provided with a central opening through which the first fluid may pass to reach said inlet.

12. In an apparatus of the character described, the combination of a receptacle provided with an inlet adapted to receive fluid, means for conveying relatively less dense fluid into said inlet to a position whereby it may be entrained by the first fluid the receptacle being provided with an outlet through which the mixed fluids are adapted to flow and means for varying the effective area of said inlet.

13. In an apparatus of the character described, the combination of a device for combining a pair of fluids having a relative difference in density, a downflow tube for conveying the combined fluids to a lower level, an upflow tube surrounding the downflow tube and communicating therewith for carrying the fluids to an intermediate level and a head on the discharge end of the upflow tube slidably connected to the downflow tube.

HENRY A. ALLEN.